United States Patent [19]
Ford

[11] Patent Number: 4,846,976
[45] Date of Patent: Jul. 11, 1989

[54] TREATMENT OF EMULSIONS

[75] Inventor: Douglas L. Ford, Eastwood, Australia

[73] Assignee: Memtec Limited, New South Wales, Australia

[21] Appl. No.: 124,841

[22] PCT Filed: Dec. 5, 1986

[86] PCT No.: PCT/AU86/00374

§ 371 Date: Jul. 29, 1987

§ 102(e) Date: Jul. 29, 1987

[87] PCT Pub. No.: WO87/03503

PCT Pub. Date: Jun. 18, 1987

[30] Foreign Application Priority Data

Dec. 6, 1985 [AU] Australia ............................... PH3765
Apr. 24, 1986 [AU] Australia ............................... PH5616

[51] Int. Cl.$^4$ .............................................. B01D 13/01
[52] U.S. Cl. .................................... 210/636; 210/641; 210/651; 210/195.2; 210/321.69; 210/321.89; 210/425
[58] Field of Search ............... 210/636, 641, 651, 799, 210/806, 315, 321.69, 321.64, 335, 338, 425, 196, 195.2, 321.88, 321.89

[56] References Cited

U.S. PATENT DOCUMENTS

| 3,912,624 | 10/1975 | Jennings | 210/636 |
|---|---|---|---|
| 4,111,812 | 9/1978 | Baddour | 210/257.2 |
| 4,201,664 | 5/1980 | Hekal | 134/10 |
| 4,309,289 | 1/1982 | Head | 210/649 |
| 4,311,594 | 1/1982 | Perry | 210/640 |
| 4,313,830 | 2/1982 | Tulin et al. | 210/639 |
| 4,332,686 | 6/1982 | Gerlach et al. | 210/651 |
| 4,366,063 | 12/1982 | O'Connor | 210/652 |
| 4,399,035 | 8/1983 | Nohmi et al. | 210/500.42 |
| 4,431,545 | 2/1984 | Pall et al. | 210/641 |
| 4,539,117 | 9/1985 | Meyer et al. | 210/651 |

FOREIGN PATENT DOCUMENTS

| 40827 | 12/1981 | European Pat. Off. . | |
|---|---|---|---|
| 52-27072 | 3/1977 | Japan | 210/636 |
| 53-108882 | 9/1978 | Japan | 210/636 |
| 54-56082 | 5/1979 | Japan | 210/636 |
| 55-049186 | 4/1980 | Japan . | |
| 1456304 | 11/1976 | United Kingdom . | |
| 2120952 | 12/1983 | United Kingdom . | |
| 85/01449 | 4/1985 | World Int. Prop. O. . | |

OTHER PUBLICATIONS

Fette, Seifen, Anstrichmittel, vol. 86, No. 1, Jan. 1984, pp. 18-23, Rautenbach et al. (English Translation).
IBM Technical Disclosure Bulletin; vol. 22, No. 7; Dec. 1979; pp. 2697-2698.

Primary Examiner—Peter Hruskoci
Attorney, Agent, or Firm—Oblon, Fisher, Spivak, McClelland & Maier

[57] ABSTRACT

A filtration system for treating an emulsion containing water, an oil or a fat, an emulsifying agent and insoluble solid material (such as a maritime oil emulsion containing an anionic detergent and the solid, greasy calcium salt of the detergent) has a first hydrophobic microfilter (126) and a second hydrophobic microfilter (147).

Both microfilters (126, 147) have a plurality of hollow porous fibers as the separating medium with the feed to the first filter (126) being applied to the outside of the fibers and the feed to the second filter (which is the permeate from the first filter) being applied down the lumens of the fibers. The first filter (126) removes the solid material and the second filter separates the oil or fat from the solid-free emulsion.

11 Claims, 6 Drawing Sheets

TREATMENT OF EMULSIONS

FIELD OF INVENTION

This invention relates to the treatment of emulsions particularly those containing an anionic surface active agent or detergent.

For the sake of convenience, the invention will be described in relation to the separation of oil from maritime oil emulsions. However, it is to be understood that the invention is not limited thereto as it may be used to treat other emulsions such as those occuring in oil production as well as industrial cooling and cutting solutions and laundry and car wash wastes.

BACKGROUND ART

Maritime oil emulsions are usually present in ballast tanks and bilges of ships. Various proposals have been put forward for separating the water from the oil and if the residual water is to be reused or disposed of in sewers or waterways, the degree of oil removal must be such that the residual water contains less than 10 parts per million of hydrocarbon oil.

The "Oil/Water Separation State-of-the-Art" publication prepared for Industrial Environment Research Laboratories in Cincinnati, Ohio by Rutgers State University, New Brunswick, N.J., United States Department of Commerce National Technical Information Service P.B. - 280755 is a thorough review of the problem and of updated separation procedures.

Few known procedures are successful when the oil emulsion is stabilised by a detergent especially when the maximum allowable oil content of the separated water is 10 parts per million. Complex chemical, physical and biological methods, often all three in sequence, are needed if the water must also meet rigid environmental specifications for detergents.

Oil/water/detergent blends are found in ship bilges and ballast tanks. The detergent can enter the ship system from deck cleaners, oil dispersers, laundry wastes, fire foams and deliberate addition to aid cleaning of oil storage tanks. Moreover, a detergent is an essential ingredient of industrial cutting and cooling emulsions and associated rinsing liquors, used to repair marine engines.

In all these uses, the detergent concentration and the chemical nature of the detergent are very variable due to sporadic need or uncontrolled dilution with fresh or salt water.

Ship requirements indicate the need for an on-board system so that water, substantially free of oil, but still containing biodegradable detergents can be released at sea, rather than be brought to shore where dockside water often cannot accept the detergents and other soluble contaminants which may arise from chemical and biological attack on the oil in the bilges. For example, poisonous hydrogen sulphide may be formed and, if so, needs immediate removal along with other soluble biological products while still at sea.

Recently, ultra-filtration has been used with limited success for these detergent stabilised emulsions. In principle, the oil is retained by its inability to flow through the very fine hydrophilic pores of the ultra-filter membrane whilst water passes under quite low pressure. The oil retention is by a combination of geometry and surface tension. The oil breakthrough pressure, P, is given by:

$$P = \frac{4s \cos a}{d}$$

where:
- s is the oil/aqueous continuous phase interfacial tension,
- a is the contact angle of the continuous phase of the pore fluid with the port wall,
- d is the pore diameter.

Detergents lower the oil/aqueous interfacial tension s and cause breakthrough of oil at even low pressures. The interaction is complex since the detergent forms micellar structures with itself and with the oil. The critical micellar concentration depends on surfactant composition, on pH, on salts and on temperature. Special problems of anionic detergents in sea water are detailed later.

A major problem with all oil/water ultrafilters arises because they are used in the "cross-flow" mode—that is, the feed flows across the ultrafilter where some water permeates, but most of the emulsion (now richer in oil) returns to the feed. Thus, the feed oil concentration continuously rises which always reduces permeation rate but this is not the worst effect. Most ultrafilters also show some rejection of soluble anionic detergent so that the detergent concentration also rises rapidly in the diminishing recycle aqueous phase.

Hence all the water cannot be substantially removed before oil breaks through. Even ultrafilters with pores rejecting over 99% of ovalbumin of molecular weight 45,000 cannot bring the oil concentration above 50% in the presence of most anionic detergents in hard water such as seawater.

A hitherto unappreciated set of effects further complicates the conventional use of hydrophilic ultrafilters to separate clear water from oils mixed with sea-water in the presence of the common anionic detergents. Seawater contains 410 parts per million of calcuim ion and this calcium partly precipitates a greasy calcium salt when more than 40 to 100 parts per million (depending on solubility in any oil present) of the usual dodecylbenzenesulfonate ion are present.

Since the usual detergent and sea water mixtures contain up to 500 parts per million of sodium dodecylbenzenesulfonate, a considerable precipitate of calcium dodecylbenzenesulfonate forms and collects at the water/oil interface. The solubility of the calcium salt in oily paraffins is only 70 parts per million and only 220 parts per million in a good aromatic solvent such as toluene. Hence there is no solvent present for the calcium salt in practical oil water separation unless huge quantities of free aromatic oil are present.

Furthermore the conventional hydrophilic ultrafilters sold for oil/water separation are strongly charged on their surfaces by sulfonate groups in order to render them hydrophilic. An unfortunate side effect arises in that Donnan effects reject some of the dodecylbenzenesulfonate ions, thus quickly increasing their concentration and precipitating greasy calcium dodecylbenzenesulfonate, even from solutions which were initially too dilute to precipitate.

The accumulation of greasy calcium salt leads to such blockage of the ultrafilter that normal backwashing with permeate is ineffective. It should be noted that ultrafilters backwash at permeation velocities of less than one meter per hour so that no jet cleaning action can be involved to remove tenacious blockages.

Calcium salts are difficult to remove from hydrophilic surfaces since they tend to adhere to the water phase rather than the oil phase. They thus adhere to the hydrophilic membranes of all present commercial oil/water ultrafilter separators.

DISCLOSURE OF INVENTION

In its broadest form, the invention provides a filtration system for treating an emulsion containing water, an oil or a fat, an emulsifying agent and insoluble solid material, said system comprising:

(i) a first hydrophobic microfilter adapted to remove insoluble solid material, and (ii) a second microfilter adapted to separate the oil or fat from the solid-free emulsion.

Preferably, both microfilters have a plurality of hollow porous fibres as the separating medium with the feed to the first filter being applied to the outside of the fibres and the feed to the second filter being applied down the lumens of the fibres.

According to another aspect of the invention there is provided a method of treating an emulsion containing water, an oil or a fat, an emulsifying agent and insoluble solid material comprising the steps of:

(i) passing the emulsion through a first hydrophobic microfilter to remove the insoluble solid material, and, (ii) passing the permeate from the first microfilter through a second microfilter to separate the oil or fat from the solid-free emulsion.

The invention may be employed in treating an emulsion in which the emulsifying agent is a detergent such as an anionic detergent and the solid material is a calcium salt of the detergent. The invention is particularly suitable for treating a maritime oil emulsion.

The cleaning of the first microfilter may be carried out in a number of ways. For example, the oil-free, detergent-saturated permeate wash may be carried out more frequently than the removal of the solids. Thus, the oil content of the solids can be controlled prior to removal. The removal of the oil-free solids may be effected by a backwash of permeate followed by a gaseous backwash.

The first hydrophobic microfilter (which has pores coarser than conventional hydrophilic ultrafilters) does not reject dissolved sulfonated detergent and is much more resistant to blockage with calcium salts of the detergent than a conventional hydrophilic ultrafilter. The first microfilter is preferably of the kind having a plurality of hollow porous fibres in which filtration is carried out by applying the feedstock to be filtered to the outside of the fibres and the filtrate or permeate (which, in one use of the system, consists of oil and salt water, saturated with the calcium dodecylbenzenesulfonate) is drawn off from the fibre lumens with backwashing of the fibres being performed by introducing a pore-stretching permeate backwash at least equal to the pore volume followed by gas into the fibre lumens. Such a first microfilter is described in International Patent Application PCT/AU84/00192 "Cleaning of Filters".

In maritime operation, the function of the first filter is to remove the small amounts of insoluble bilge solids, usually formed by rusting of iron, as well as the small amounts of solid, greasy calcium salt of the anionic detergent. These solids may be diverted back to the bilge or to a storage tank for shore disposal. There is no harm in bilge storage except that the air backwash must be more frequent as the solids content rises.

However, the air backwash to bilge has been found advantageous in preventing anaerobic production of hydrogen sulfide and of the finely particulate ferrous sulfide formed in the bilge. The result was that less solids eventually came from the bilge when solids were recirculated there with aerated water than when the solids were diverted into a separate tank. Of course the solids were of a different composition in each case. The oxidised solids are safer on the grounds of lack of toxicity and pyrogenicity. This greater safety is another advantage of the invention.

Nevertheless the greasy calcium salt and some of the other solids and dirt eventually slow the permeation rate of this first filter, resisting the pore-opening small backwash with high pressure permeate and the gas-pulse (usually air) backwash. There is still some oil clinging to these solids and the filter walls and pipes.

In one form of the invention, the oil droplets are rinsed back to the bilge with fresh sea-water to which 20 to 50 parts per million of alkylbenzenesulfonate detergent has been added.

It is now possible to wash the tenaciously retained oil-free solids out to sea with fresh sea-water. The fresh sea-water also dissolves the calcium alkylbenzenesulfonate. The discharge benefits further from a permeate followed by gas backwash.

In another form of the invention, the oil is removed by occasional protracted washing through the walls of the first filter with recycled oil-free permeate which is saturated with about 40 p.p.m. of calcium dodecylbenzenesulfonate from the recycle permeate tank. The oil-free solids may then be back-blown with a pore-stretching backwash of permeate and gas to storage or to sea. Very little permeate is lost and very little detergent, if any, goes to sea. This freedom from oil and detergent is useful when in protected waters.

In either case the first filter is now ready to resume its duty. The permeate from the first filter is always free of solids but is not optically clear. Depending on the pressure drop through the pores, a considerable part of the oil may permeate as coalesced larger clumps of greasy grease. These oily clumps settle rather readily but are best separated by a second microfilter of average pore size ranging from 0.1 to 0.5 micron. A high pressure differential through the pores keeps the oil in a fine suspension. The second stage copes with any range of droplet sizes of oil.

The oil/water suspension, still containing a saturated solution of calcium salts of the anionic detergent in solution is treated with a second microfilter preferably without any intermediate storage, thus avoiding the need for another pump and the risk of air bubbles. Unlike the first filter, the second filter works best if the oil/water mixture is fed through the lumens of the porous hollow fibres. There is then little kinetic or turbulent impact of oil drops to counteract surface tension separation. The hydraulic pressure drop through the porous walls of the fibres of the second filter should be kept uniformly below the pressure needed to force the finest drops through the pores against the action of the surface tension.

The second microfilter does not clog because there are no solids in the feed and because it does not reject alkylbenzenesulfonate to cause precipitation of calcium soaps in the recycle stream.

The permeate from the second filter runs into a permeate tank and is a substantially oil-free water (less than 10 parts per million of oil) which contains calcium salts of the anionic detergent in solution. Since these salts are biodegradable they are acceptable in the open sea and many marine waters. If necessary they may be mixed with excess sea-water before disposal to aid widespread dispersion and consequent dilution.

In especially sensitive waters the detergent may have to be removed or destroyed rather completely by chemical means before discharge. This problem of detergent disposal is now a separate problem. The invention has prevented any oil discharge to the sea. It should be noted that no detergent is actually destroyed in use. The present invention thus allows the maximum recycle of available detergent. Most spills can be washed down with the permeate which is optically clear (i.e. clearer than sea water), and because of the presence of excess calcium salts, such permeate can contain no more detergent in any case. The permeate tank can be kept half full in sensitive waters. No detergent need be discharged until more open waters permit the discharge of such concentrations of biodegradable detergent.

The invention thus differs from any earlier disclosures of marine oil/water separation in that:

(1) Specific arrangements are made to prevent filter surfaces being blocked by the sparingly soluble calcium salts of anionic detergents.

(2) The invention allows discharge of oil-free bilge dirt and rust to the sea, or to storage, as desired.

(3) The invention allows the controlled, permitted discharge of oil-free sea water or sea water containing dissolved calcium salts of anionic detergents, if the salts are present.

(4) The invention allows the maximum possible recycle of detergents. Only a small make up is needed and is often supplied by special spill use.

(5) The separation of oil-free solids, oil and an oil-free sea-water solution of calcium salts of anionic detergents requires two filters to accomplish the separate functions needed to give three fractions.

(6) The first filter requires a gas-pulsed backwash whilst the second filter does not handle solids and does not block.

(7) The first filter requires feed to the outside of the porous hollow fibres whilst the second filter is best fed down the fibre lumens. This preference arises because the second filter does not require a gas pulse backwash. Also lumen feed reduces kinetic impingement of oil droplets adding to the hydraulic transmembrane pressure, thus reducing oil penetration.

(8) Neither filter is a sulfonated hydrophilic ultrafilter of the type which shows at least some rejection of dissolved anionic detergent anion. The first filter must reject solid calcium soaps but not the dissolved soap anion. All of the normal commercial negatively charged ultrafilters with surfaces made hydrophilic with carboxylic or sulfonic groups show some of the undesired alkylbenzenesulfonate anion rejection. Thus hydrophobic microfilters made of polyolefines or fluorocarbons are preferred. The larger pores of the microfilters give little anion rejection, even if coated with negatively charged groups.

BRIEF DESCRIPTION OF THE DRAWINGS

In order that the invention may be more readily understood and put into practical effect, reference will now be made to the accompanying drawings in which.

DESCRIPTION OF THE PREFERRED EMBODIMENTS

Figure 1:
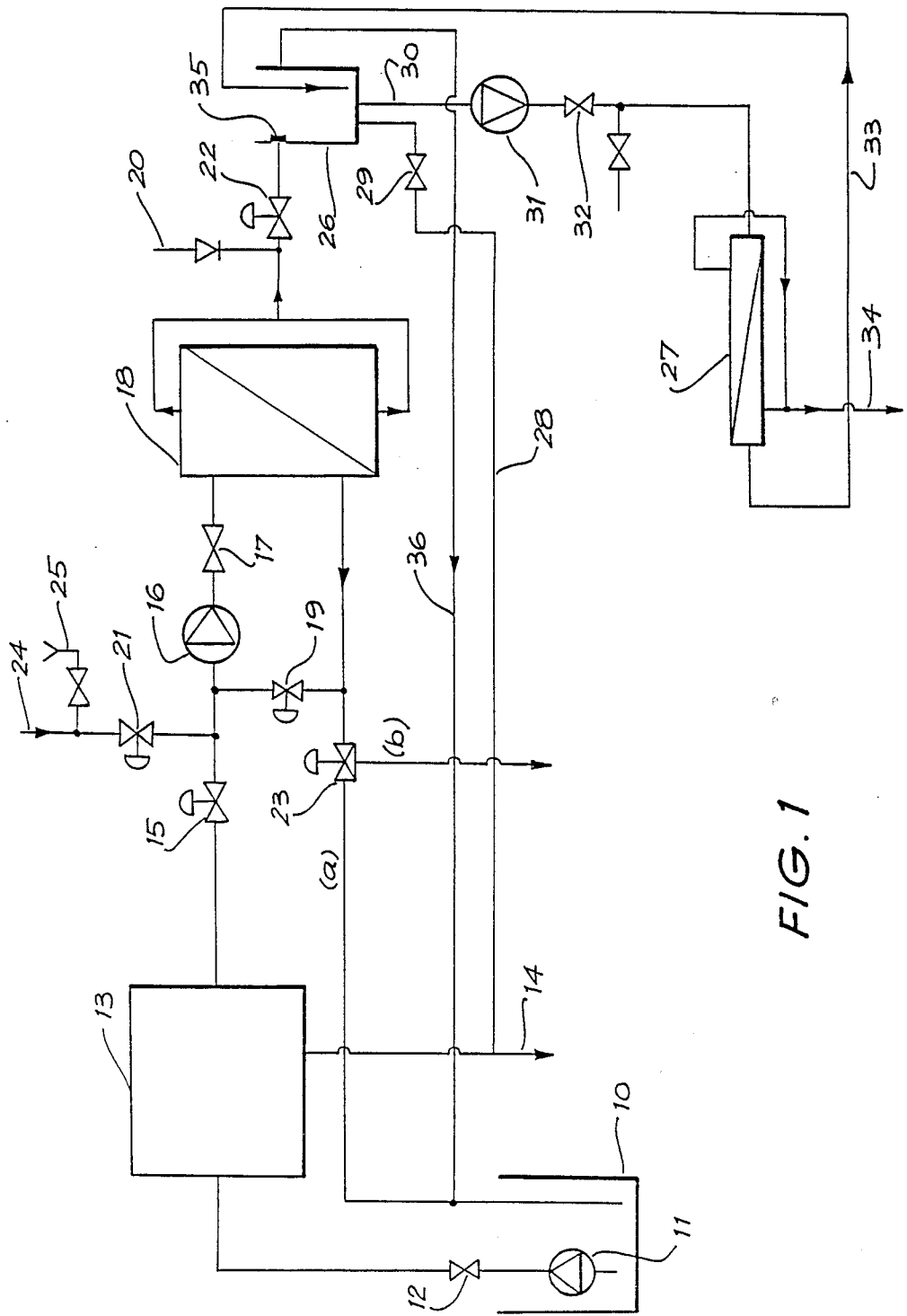
FIG. 1 is a schematic diagram of a filtration system for separating maritime oil emulsions according to one embodiment of the invention.

The filtration system shown in FIG. 1 is particularly suitable for small ships and includes a bilge or sullage tank which is represented by tank 10. The bilge contents are pumped by pump 11, through the diaphragm valve 12 at 500 liters/hour through a normal marine oil/water plate separator and a 25 micron coalescer/filter unit 13. The upper oil layer from the separator/filter unit 13 is automatically pumped to a sludge tank (not shown) for storage through line 14.

The lower layer from the separator/filter unit 13 passes through the pneumatic valve 15 to make up a circulating feed stream. This feed stream is pumped by pump 16, via valve 17, over the outside of 5 square meters of porous, hollow, 0.2 micron average pore-sized, fibres of the tube in shell microfilter 18. The more concentrated feed passes back to the feed stream via pneumatically-controlled valve 19.

As the pores in the fibres in the microfilter 18 block, they are cleaned by a backwash of compressed air from line 20. To allow this backwash, valves 15, 21,19 and 22 are shut and 3-way valve 23 is set open in direction "a". Thus a small volume of permeate is forced at pore-stretching pressure back through the pores. This does not remove the adherent cake clogging the surface of the pores but only fine particles within the pores.

To clean the surfaces, all permeate is blown from the pore lumens and 3-way valve 23 is set to a completely closed intermediate position (otherwise a 4-way valve may be used). The feed side of the filter 18 is now filled with incompressible liquid and the compressed air from line 20 fills the lumens with little break-through of the pores.

The 3-way valve 23 is then opened along direction (a). Air then breaks through the pores all along the lumens of the fibres expands as it leaves the pores and blasts off all but the most adherent deposits from the fibre surfaces and the walls of the filter shell. These flow with the shell liquids back to the tank 10.

After long use, the build-up of greasy calcium salts is such that they are not adequately removed, even by the gas backwash. When that occurs, sea water is introduced through line 24 and mixed with a small amount of detergent added through line 25 (usually less than 50 parts per million of detergent is required in the mix).

The seawater/detergent mix passes through valves 21, 17 and 23 back to the tank 10 to rinse out all oil from the microfilter 18.

The 3-way valve 23 is then set to allow flow in direction (b) to the sea. The detergent addition is stopped and a full flow of sea water washes out oilfree solids and dissolves the calcium soaps. Absence of frothing shows complete enough removal of these sparingly soluble soaps. Thus the functions of microfilter 18 are carried out.

However, the normal operation of microfilter 18 delivers solid-free but still an oil-containing emulsion through valve 22 into the intermediate tank 26. The oil is in the form of a coalesced grease. The grease contains fine aqueous liquid in the oil and the grease forms coarse lumps. The lump size is largely determined by the transmembrane pressure used in microfilter 18. Due to the complete absence of blocking solids and insoluble greasy calcium soaps, a second filter 27 of different design to microfilter 18 is now needed.

Microfilter 27 is a simple shell in tube design containing 2 square meters of porous, hollow fibres. The fibre lumens are preferably wider than in microfilter 18.

Microfilter 27 is connected to the outlet 30 of the tank 26 through pump 31 and valve 32. The more concentrated feed is returned to the tank 26 through line 33. Oil free water is drawn off through line 34. A plate 35 is used to break the flow into the tank 26. Any overflow from the tank 26 is returned to the tank 10 through line 36.

Whereas microfilter 18 preferably has lumens ranging between 200 microns and 1 millimeter to give maximum filter area and greater tolerance to crushing and bursting forces, microfilter 27 has a milder service. The lumens in microfilter 27 are preferably from 0.3 millimeter to 5 millimeters in diameter. The smaller size allows greater flow velocities but it is important not to generate a pressure drop along the hollow fibre which would force oil through against the surface tension. Thus near 0.5 millimeters is optimal for 1 meter length of 0.2 micron average pore size hollow fibres in microfilter 18.

The oil accumulating in tank 26 is periodically or continuously vented to the oil sludge tank via line 28 having valve 29.

Having described one embodiment of the invention in general and having illustrated a preferred form for a small ship the operating results of examples will further clarify the invention.

EXAMPLE 1

The cloud point of 500 parts per million sodium dodecylbenzenesulfonate (NaDDBS) in pure sodium chloride solutions was determined.

15 g/l of sodium chloride and 0.5 g/l of NaDDBS clouded at 16 degrees Celsius.

30 g/l of sodium chloride and 0.5 g/l of NaDDBS clouded at 40 degrees Celsius.

Since sea-water has an ionic strength nearer 33 g/l of sodium chloride and also contains an excess of calcium ion over the dodecylbenzenesulfonate ion at the usual test condition of 500 parts per million of NaDDBS it is obvious that considerable dodecylbenzenesulfonate must precipitate as salts. The effect of calcium ion and a paraffin oil was next checked.

EXAMPLE 2

50 ml of water containing 0.5 g sodium chloride and 500 parts per million of sodium dodecylbenzenesulfonate (NaDDBS) were treated with 0.04625 g of calcium chloride (equivalent to the calcium in sea-water). A precipitate formed. 50 ml of petroleum spirit (b.p. 80–100 Celsius) were added but did not dissolve much of the precipitate. After long settling the bottom clear aqueous phase contained 70 parts per million of NaDDBS; the clear petroleum spirit layer contained 10 parts per million, calculated as NaDDBS; whereas the semi-solid stabilized interface layer contained the residue. Thus calcium salts in sea-water greatly affect the distribution of the detergent between the various phases; most detergent is present as the precipitated calcium salt. The calcium salt was prepared and found to be a friable grease at 20 degrees Celsius.

EXAMPLE 3

In the apparatus of FIG. 1, a mix of sea-water containing 490 parts per million of sodium dodecylbenzenesulfonate and 1000 parts per million of Diesel oil was treated. The second filter, 5, had 5 millimeter internal diameter porous, hollow fibres of 0.2 micron average pore size.

At 35 degrees Celsius and one atmosphere transmembrane pressure filter, 5, gave an initial flux of 200 liters/sq. meter/hour of clear permeate containing 7 parts per million of oil and 40 parts per million of soluble dodecylbenzenesulfonate, calculated as the sodium salt. On cooling a faint haze of calcium dodecylbenzenesulfonate formed. This could be re-dissolved by warming to 40 degrees Celsius or by adding an equal volume of sea-water.

Figure 2:
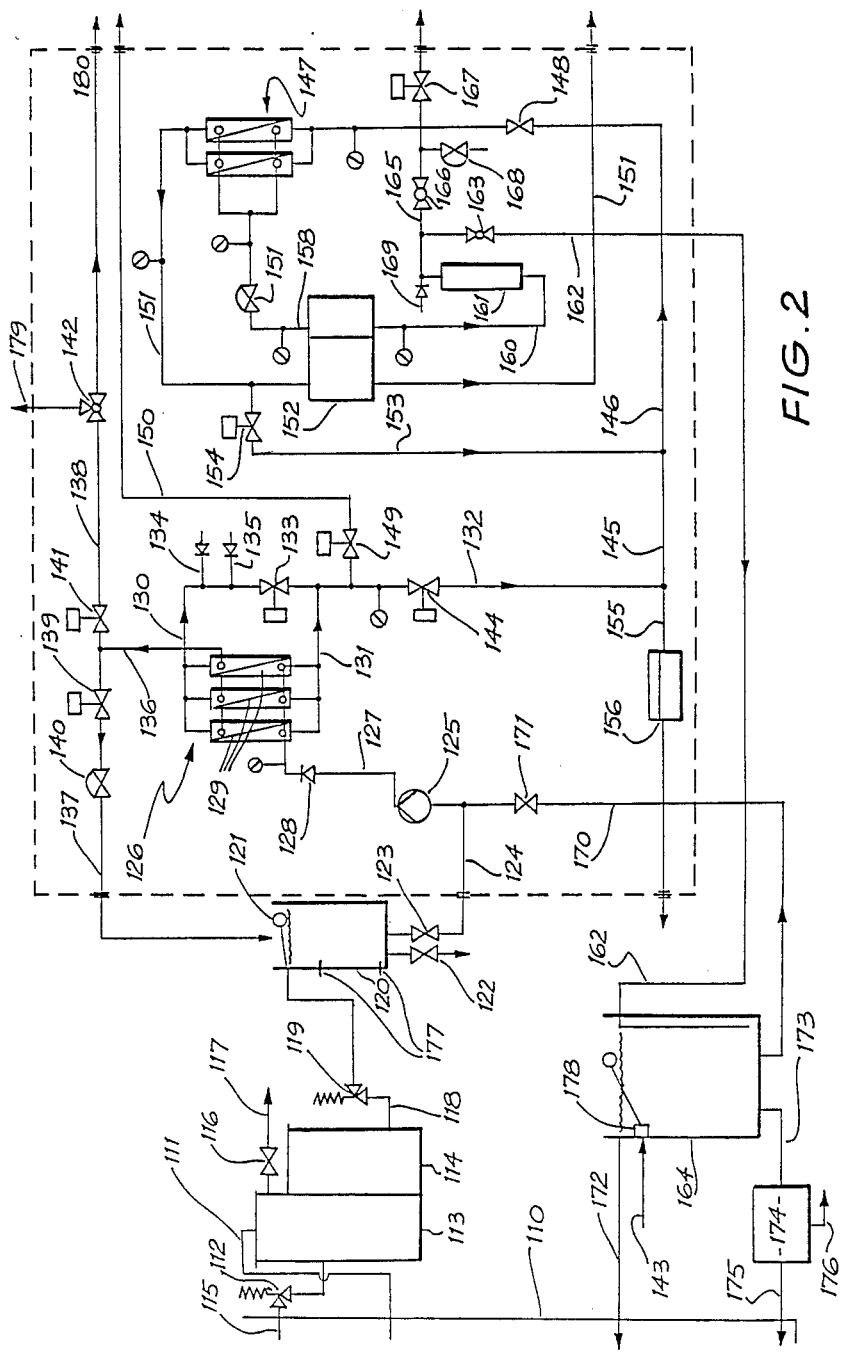
FIG. 2 is a schematic diagram of a filtration system for separating maritime oil emulsions according to the second embodiment of the invention.
Figure 3:
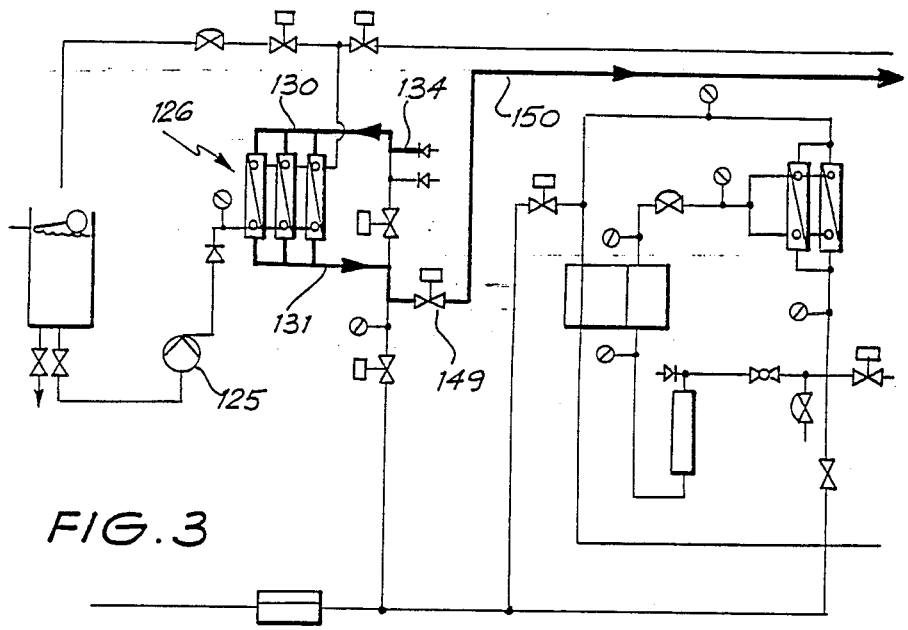
FIG. 3 is a simplified version of FIG. 2 showing the first step of backwashing the first microfilter.

The filtration system shown in FIG. 2 is also particularly suitable for small ships and includes a bilge or sullage tank which is represented by a large tank 110. The maritime oil emulsion is withdrawn from the tank 110 through line 111 and is delivered to plate separators 113, 114. The plate separators 113 and 114 are protected by relief valve 112 and any overflow is returned to tank 110 through line 115. Oil concentrate is discharged through valve 116 to line 117.

Feed is drawn from the plate separator 114 through line 118 and controllable valve 119 to a tank 120 the level of which is controlled by float valve 121. The tank 120 has a drain valve 122 and an outlet valve 123 in feed line 124 that is connected to the suction side of pump 125. The pump 125 delivers oil emulsion feed to the first microfilter 126 through line 127 having a one way valve 128. The feed is supplied to the outside of porous, hollow fibres of 0.2 micron average pore size within the shells 129.

Insoluble bilge solids and the calcium salt of the detergent are retained by the porous fibres and the permeate (of oil and salt water saturated with calcium dodecylbenzenesulfonate) is drawn from the fibre lumens through discharge lines 130 and 131 to main first permeate line 132. Upstream from the junction of the discharge lines 130 with the discharge line 131 there is a controllable valve 133 and upstream of valve 133 there is a low pressure air inlet 134 and a high pressure air inlet 135.

The concentrate from first microfilter 126 is discharged through line 136 to line 137 for recirculation and line 138 for drainage to the bilge or elsewhere. Flow through recirculation line 137 is controlled by valves 139 and 140 and flow through drainage line 38 is controlled by valves 141 and 142.

Permeate from line 132 passes through controllable valve 144 to lines 145 and 146 to the lumens of the fibres in the second microfilter 147. Flow in line 146 is controlled by valve 148. The first filter permeate may also be discharged through valve 149 to drain line 150.

The second microfilter 147 removes the oil from the water and the oil/water concentrate is drawn off in discharge line 151 through one side of a pressure equalising valve 152. A by-pass line 153 having a controllable valve 154 is connected between second microfilter discharge line 151 and the first microfilter permeate line 145. Feed pressure to microfilter 147 is regulated by by-pass control valve 156 in line 155.

Permeate from the second microfilter passes through valve 157 in line 158 to the other side, the pressure equalising valve 152, line 160, permeate collection tank 161 and line 165 having valve 166 and controllable valve 167. A sampling valve 168 is located between valves 166 and 167. A low pressure air inlet 169 is located upstream of the hold-up cylinder 161 for cleaning purposes. The permeate may also be discharged through line 162 having valve 163 to clear permeate tank 164.

In order to clean the first microfilter 126, clear permeate from the tank 164 is drawn through line 170 having valve 171. Valve 123 in line 124 is, of course, closed whilst the first microfilter is being cleaned. All the controllable valves are controlled by a programmable controller (not shown).

An overflow line 172 runs from the clear permeate tank 164 to the tank 110 and discharge line 173 leads to valve system 174 which can direct the permeate to line 175 (to the tank 110) or to line 176 (for use).

The second microfilter 147 is a simple tube-in-shell design containing two square meters of porous, hollow fibres. The fibre lumens are preferably of larger diameter than those of first microfilter 126.

The first microfilter 126 preferably has lumens ranging between 200 microns and 1 millimeter to give maximum filter area and greater tolerance to crushing and bursting forces. As the second microfilter 147 has a milder service, the lumens of the fibres in the second microfilter 127 are preferably from 0.2 millimeters to 5 millimeters in diameter. The smaller diameter allows greater flow velocities but it is important not to generate a pressure drop along the hollow fibre which would force oil through against the surface tension. Thus 0.5 millimeters is near optimal for 1 meter length of 0.2 micron average pore size hollow fibres in the second microfilter 147.

On stoppage of filtration due to machine shut-down or low level indication in tank 120 by level switches 177, backflush of second microfilter 147 occurs. During this process controllable valve 167 is closed. Low pressure air is introduced through non-return valve 169 into the tank 161. Permeate is then pushed back along line 160 through the right hand side of the equalising valve 152 to the microfilter 147.

The backflushed permeate passes through line 151, valve 154, lines 153, 145 and 155 and by-pass control valve 156 to the bilge or elsewhere. Backflushed permeate also exists through line 146. During backflush, the by-pass control valve 156 is opened to minimize restriction in the line 155.

In the wash cycle of microfilter 147, valve 166 is closed, valve 163 is opened and clean permeate flows to tank 164 through line 162. During this process tank 164 may be kept full of sea water by feed from line 143 through float valve 178. Sea water is used only when there is insufficient fresh permeate. Sea water could be introduced into line 146 and filtered prior to entering tank 164.

Under normal filtration or wash cycle modes, air backwash of microfilter 126 is performed automatically at set time intervals. Backwashing consists of a number of cycles in which rejected material is directed through line 136 and valve 141 and 142 to sea through line 179 or to the bilge through line 180.

At the end of backwash, exhausting of permeate occurs to eliminate air in permeate lines 130 and 131. The permeate is exhausted through line 150 to the bilge by closing valve 144 and opening valve 149. After a preset time permeate is directed to microfilter 147 by opening valve 144 and closing valve 149.

The backwashing programme for the system will now be described in relation to FIGS. 3 to 8 where the heavy lines indicate the flow of liquid and/or gas. Components not necessarily concerned with backwash have been omitted from FIGS. 3 to 8.

The backwashing programme for the first microfilter 126 is shown in FIGS. 3 to 6. Initially, the pump 125 is turned off and low pressure air is introduced through lines 134 and 130 to the first microfilter 126. The filtrate contained in the lumens of the fibres of the filter 126 is discharged through line 131, valve 149 and drain line 150.

Figure 4:
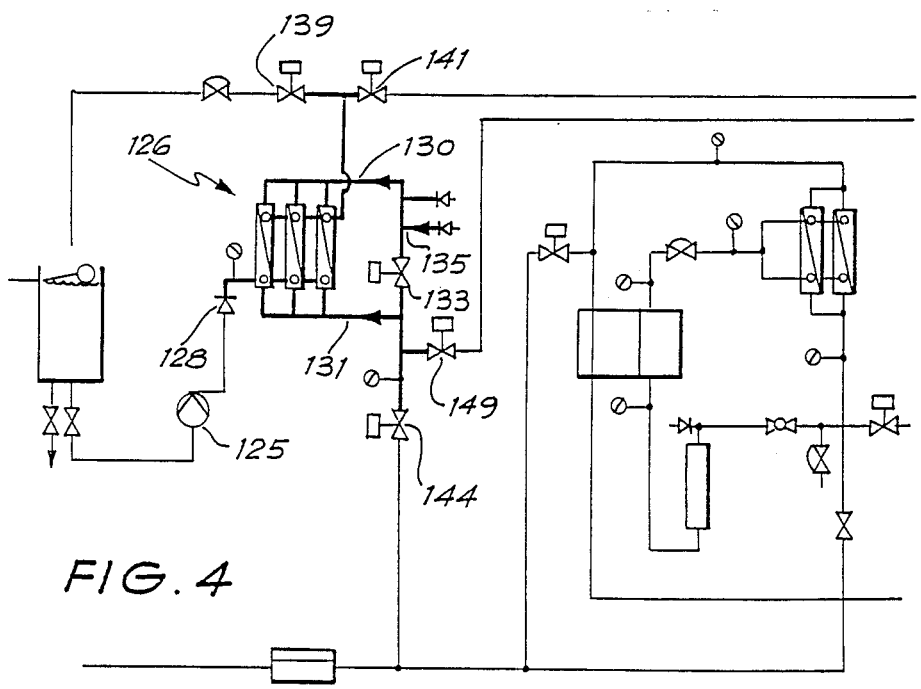
FIG. 4 is a diagram similar to FIG. 3 showing the second step of backwashing the first microfilter.
Figure 5:
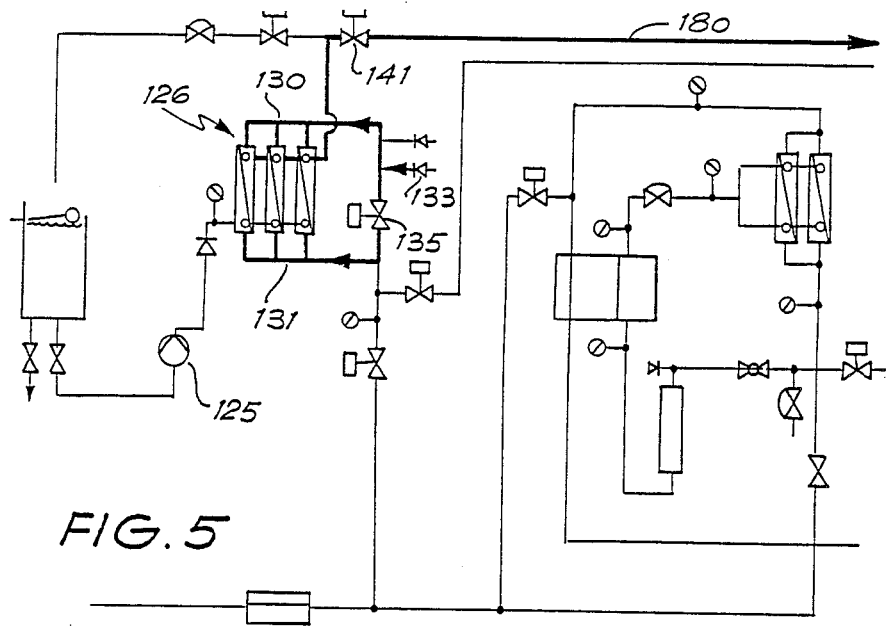
FIG. 5 is a diagram similar to FIG. 3 showing the third step of backwashing the first microfilter.
Figure 6:
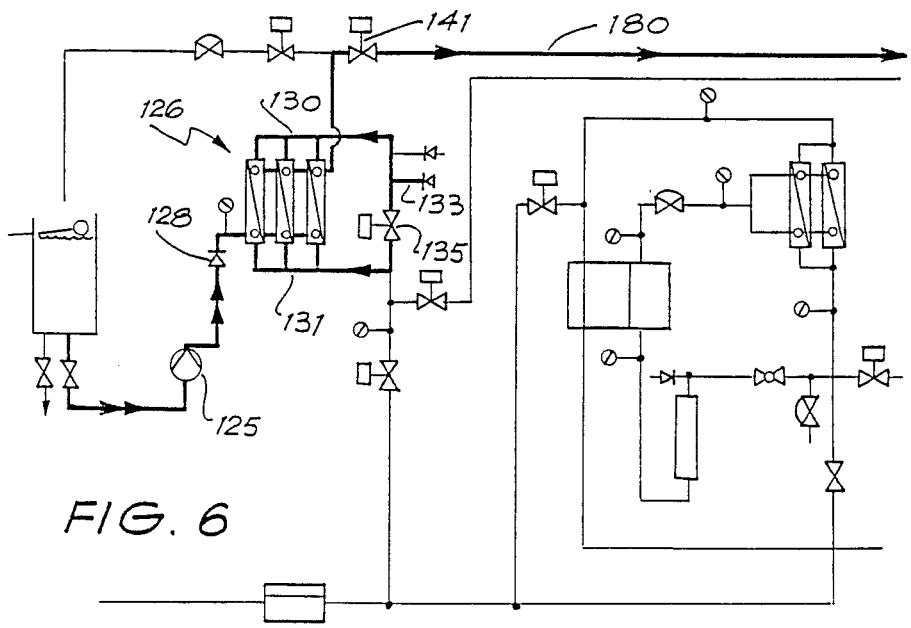
FIG. 6 is a diagram similar to FIG. 3 showing the fourth step of backwashing the first microfilter.

With valves 149, 144, 128, 139 and 141 closed and valve 133 open, high pressure air is introduced into line 135 (whilst low pressure air through line 134 remains on), to pressurise the individual cartridges of the first microfilter 126—see FIG. 4. Valve 141 is then opened (and air line 134 closed) so that the fibres within the first microfilter 126 are blown with high pressure air with discharge through line 180—see FIG. 5. In the three steps shown in FIGS. 3,4 and 5, the pump 125 remains off.

Pump 125 is then turned on, valve 128 opened and the fibres of the first microfilter 126 blown with high pressure air whilst feed is applied to each cartridge of the filter 126. Discharge is still through line 180—see FIG. 6.

Figure 7:
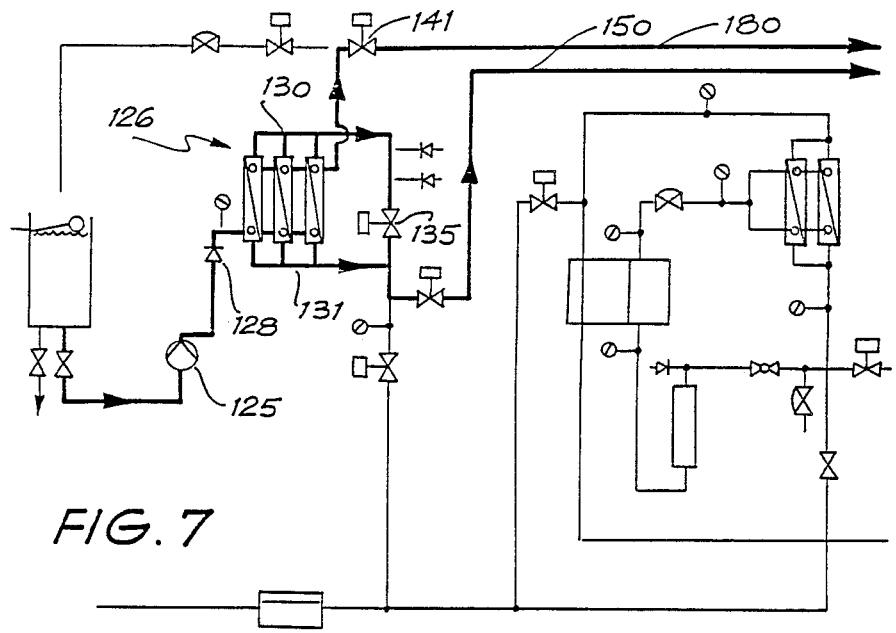
FIG. 7 is a diagram similar to FIG. 3 showing the air exhaust step at the end of the backwashing of the first microfilter.

The final step of the backwash programme for the first microfilter is shown in FIG. 7. Air lines 134, 135 are closed and valve 149 is opened to allow additional liquid discharge through line 150 and exhaust of all air from the system.

Figure 8:
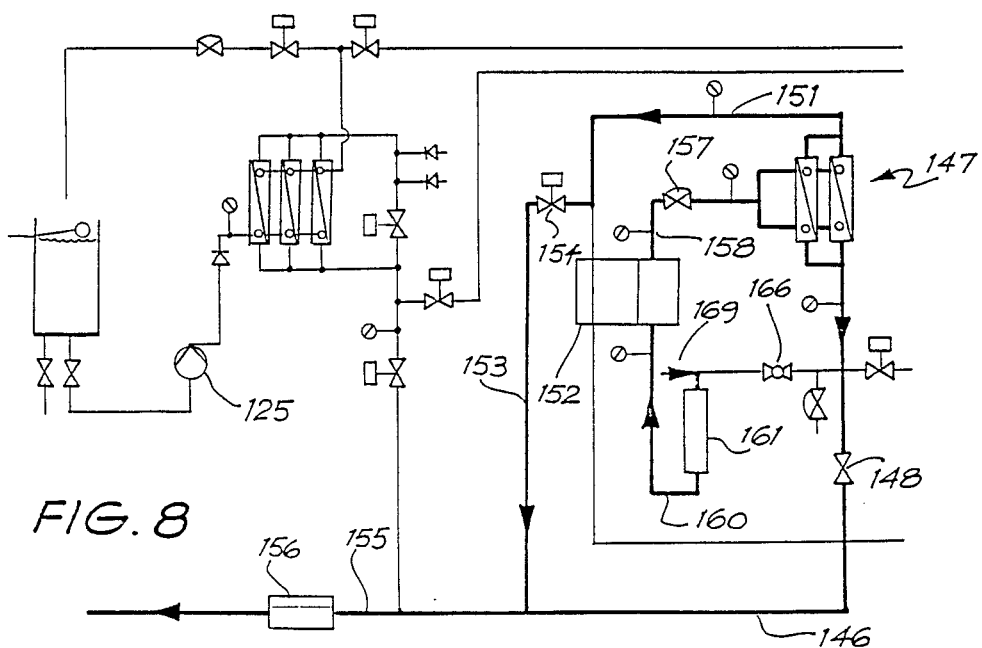
FIG. 8 is a diagram similar to FIG. 3 showing the backwashing of the second microfilter, and, FIG. 9 is a diagram similar to FIG. 3 showing the system in its normal filtering mode.

The backwash step for the second microfilter 147 is shown in FIG. 8. Valves 148, 154, 157 and 169 are opened and valve 166 is closed so that permeate is pushed back along line 160 to the microfilter 147 from where it is discharged through lines 153 and 146.

Figure 9:
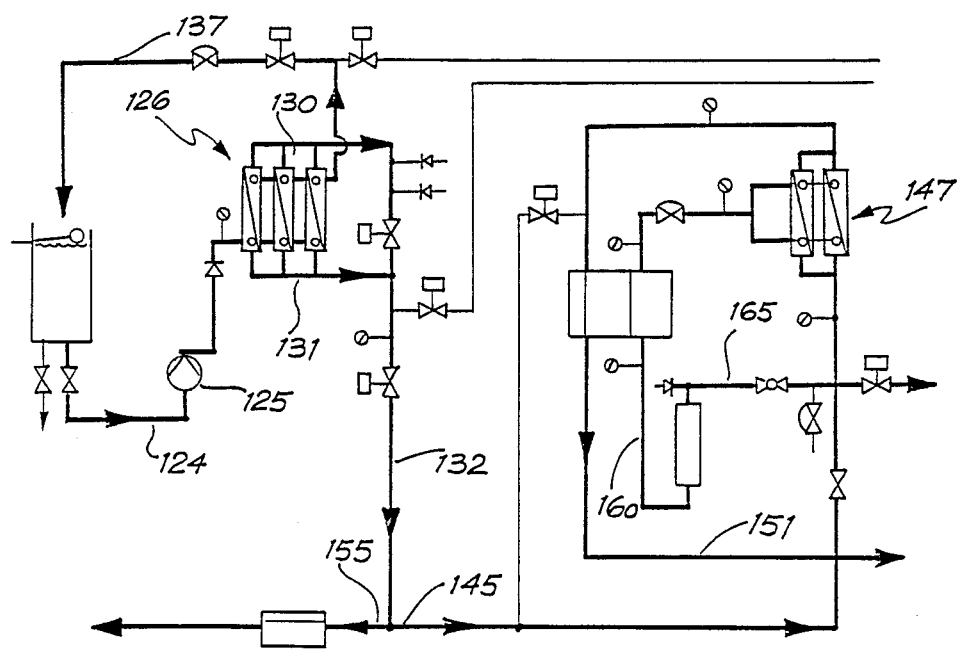

At the completion of both backwashing steps, the system is returned to its filtering mode as shown in FIG. 9.

Although the invention has been described in relation to separation of maritime oil/water emulsions in the presence of anionic surfactants, the invention is equally applicable to the separation of laundry, car wash and other wastes that involve a mixture of water, calcium ions (from hard water or from the item being washed), oil or fat, and anionic surfactant. The invention allows recovery of water and sufactant, and greatly reduces the need for expensive disposal of waste water with a high oxygen demand. The invention has been tested with a proprietry laundry detergent, "Omo", and has worked satisfactorily.

Various other modifications may be made in details of design, construction and operation without departing from the scope and ambit of the invention.

I claim:

1. A filtration system for treating an emulsion containing water, an oil or fat, an anionic detergent and insoluble solid material including calcium salts of anionic detergents, said system comprising:
   (i) a first hydrophobic microfilter having a plurality of hollow porous fibers and means for applying said emulsion to the outside of the fibers, to remove said insoluble material from the emulsion and form a solid-free emulsion; and
   (ii) a second hydrophobic microfilter having a plurality of hollow porous fibers containing fiber lumens, and having an average pore size of greater than 0.1 up to 0.5 microns, and means for applying said solid-free emulsion through the lumens of the fibers, to separate said oil or fate from the solid-free emulsion and form substantially oil-free or fat-free water.

2. The filtration system according to claim 1, and including means for periodically washing the first microfilter to remove retained insoluble solid material.

3. The filtration system according to claim 1 and including means for periodically washing the first microfilter with recycled substantially oil-free or fat-free permeate containing the anionic detergent from the second microfilter so as to remove oil or fat retained on the removed insoluble solid material.

4. The filtrate system according to claim 2 or claim 3, wherein the means for washing the first microfilter effects a backwash of permeate from the second microfilter followed by a gaseous backwash.

5. The filtration system according to claim 1, wherein said second hydrophobic microfilter has an average pore size of at least 0.2 microns.

6. A method of treating an emulsion containing water and oil or fat, an anionic detergent and insoluble solid material including calcium salts of anionic detergents, comprising:
   (i) passing said emulsion through a first hydrophobic, microfilter having a plurality of hollow porous fibers by applying said emulsion to the outside of the fibers, to remove said insoluble solid material from the emulsion and form a solid-free emulsion; and
   (ii) passing the solid-free emulsion from the first microfilter through a second hydrophobic microfilter having a plurality of hollow porous fibers containing fiber lumens, and having an average pore size of greater than 0.1 up to 0.5 microns, through the lumens of the fibers, to separate said oil or fat from the solid-free emulsion and form substantially oil-free or fat-free water.

7. The method according to claim 1 wherein the water is seawater.

8. The method according to claim 6, and including the step of periodically washing the first microfilter to remove the retained insoluble solid material.

9. The method according to claim 6, and including the step of periodically washing the first microfilter with recycled substantially oil-free or fat-free permeate containing the anionic detergent from the second microfilter, so as to remove oil or fat retained on the removed insoluble solid material.

10. The method according to claim 8 or claim 9, wherein the washing step for the first microfilter includes a backwash of permeate from the second microfilter followed by a gaseous backwash.

11. The method according to claim 6, wherein said second hydrophobic microfilter has an average pore size of at least 0.2 microns.

* * * * *